United States Patent Office 2,837,400
Patented June 3, 1958

2,837,400

TRIOXODIZIRCONIUM HYDROXY HALIDES

Warren Barnett Blumenthal, Niagara Falls, N. Y., assignor to National Lead Company, New York, N. Y., a corporation of New Jersey No Drawing. Application May 27, 1954
Serial No. 432,919

15 Claims. (Cl. 23—14)

The invention of the present application relates to compounds of zirconium and is particularly concerned with novel basic halides of zirconium having new and valuable properties and with methods of preparing such halides.

In recent years there have been found numerous uses for halogen compounds of zirconium. To mention some of their more prominent uses, aqueous solutions of such compounds have been employed in the preparation of precipitated pigments and in treatments for rendering textiles water-repellent. They have also been used as ingredients or deodorant lotions, in pharmaceutical preparations for topical application, and as ingredients for paint and ink vehicles. The anhydrous tetrachloride and tetraiodide of zirconium have also been extensively used in zirconium metallurgical processes. The excessive acidity of aqueous solutions of zirconium halides has prevented more extensive use of such salts. Solutions of zirconyl chloride, for example, have pH values that are approximately the same as those of hydrochloric acid of the same molarity. Since solutions of other zirconium salts, such as zirconium sulphate, have correspondingly low pH values, the utility of zirconium salts is somewhat limited. For example, the strongly acid reaction of their aqueous solutions is a great disadvantage in the preparation of lotions and other pharmaceutical products which are in contact with the skin. The low pH is also a disadvantage in the treatment of textiles and in many other proposed uses.

It is, therefore, an object of the present invention to provide novel water soluble salts of zirconium which have moderate acidities in aqueous solution.

Another object of the invention is to provide basic zirconium halides of novel composition and structure.

A further object of the invention is to provide as novel compounds trioxodizirconium hydroxy halides.

Still another object of the invention is to provide novel methods of producing basic zirconium halides of the type described.

The foregoing objects have been achieved in the present invention by and in connection with the discovery and production of a new class of basic halides of zirconium. These halides are water soluble, glass-like solids whose aqueous solutions are markedly less acid than solutions of previously reported zirconium halides at like concentrations of zirconium. These novel compounds, which may be identified as trioxodizirconium hydroxy halides, are distinguished in their compositions in that in each molecule thereof the ratio of halogen atoms to zirconium atoms is 1:2. Their composition corresponds to the empirical formula $Zr_2O_3OHX \cdot yH_2O$ in which "X" stands for a halogen atom and "y" is a variable number. In a typical sample of a solid, glass-like trioxodizirconium hydroxy chloride the value of "y" was determined to be 3.38. It will be understood that because of the amorphous nature of these novel compounds, as shown by their X-ray patterns, the value of "y" may vary rather widely.

It should be understood that "X" in the formula set forth in the preceding paragraph may be either chlorine, bromine or iodine. Since the chemistry of the fluorides of zirconium is considerably different from that of the other halides of zirconium, and since the fluorides are generally only very sparingly soluble in water in contrast to the ready solubility of the chlorides, bromides and iodides, the present invention is not concerned with zirconium basic fluorides. It should, therefore, be understood that in the following description the term "halogen" will be used in the restricted sense of designating chlorine, bromine and iodine and the term "halide" will hereinafter be used similarly to refer only to chlorides, bromides and iodides.

In the following examples there are set forth procedures by which novel basic zirconium halides of the type with which this invention is concerned may be prepared.

EXAMPLE 1

A precipitate was obtained by adding, slowly and with constant stirring, a solution obtained by dissolving approximately 618 g. of zirconyl chloride, $ZrOCl_2 \cdot 8H_2O$, in enough water to make 1000 ml. of solution to a liter of an aqueous solution of sodium carbonate, the latter solution containing 95 g. of the anhydrous salt. The addition of the zirconyl chloride solution was continued until a permanent pH of substantially 4.0 was obtained in the slurry produced. Stirring was continued for about 15 minutes after which the precipitate was filtered off and the filter cake was washed with water until the effluent was free of chlorides. Analysis of the filter cake showed it to contain 19.6% zirconium, expressed as $ZrO_2$. A portion of the cake weighing 63.5 g. was then dissolved in 5.13 g. of a 35.6% hydrochloric acid solution. A clear solution of trioxodizirconium hydroxy chloride resulted. When evaporated to dryness, at room temperature, the product was obtained as a clear, glassy solid which redissolved when added to water. It also was soluble to a small extent in methanol. The composition of the product corresponded to the formula $$Zr_2O_3OHCl \cdot yH_2O$$

In carrying out the precipitation in Example 1, it is generally important to have the pH of the resultant slurry as near 4.0 as possible. Slight variation from this acidity may not be objectionable. However, if the pH is higher, the precipitate will contain undesired sodium and, if lower, unwanted zirconium basic halides will be precipitated. Consequently, it will be desirable for the pH not to vary substantially from 4.0. The precipitate obtained in all cases contains a considerable amount of loosely bound water. The water content, and thus the zirconium content also, will vary somewhat depending upon variations in the concentrations of the reacting solutions, temperature and other factors. Such a variation in zirconium content does not affect the subsequent solution of the precipitate or the formation of the desired basic chloride since the hydrochloric acid is added to the precipitate in stoichiometric proportion to the zirconium content thereof.

EXAMPLE 2

Trioxodizirconium hydroxy bromide was obtained by dissolving 63.5 g. of the filter cake obtained in Example 1 in 8.5 g. of a 47.7% hydrobromic acid solution and evaporating the clear solution obtained at room temperature. The bromide compound, the composition of which corresponded to the formula  $Zr_2O_3OHBr \cdot yH_2O$, was a transparent, glassy solid. It had a deep amber color, was quite soluble in water, and was slightly soluble in methanol.

EXAMPLE 3

Trioxodizirconium hydroxy iodide was prepared in a similar manner. 13.25 g. of a 48.3% hydriodic acid solution were used to dissolve 63.5 g. of the washed precipitate obtained in Example 1. Upon evaporating the resultant solution at room temperature a transparent, glassy solid of brownish color was obtained. This solid had a composition corresponding to the formula $$Zr_2O_3OHI \cdot yH_2O$$

It was somewhat soluble in methanol and quite soluble in water.

In the foregoing examples the preparation of the solid trioxodizirconium hydroxy halides requires a two-step process involving the production of a basic hydrated precipitate and the dissolving of that precipitate in a hydrohalogen acid. By proper regulation of the concentration and amounts of the reactants, solutions of the novel zirconium hydroxy halides described above may, however, be obtained in one reaction. This is illustrated, with respect to the production of trioxodizirconium hydroxy chloride, in the following example.

EXAMPLE 4

250 ml. of a solution containing ¾ of a mol, i. e. 79.5 g., of sodium carbonate ($Na_2CO_3$) were added slowly with continuous stirring to 523 ml. of a zirconyl chloride solution containing 323.3 g. of zirconyl chloride (1 mol). There was obtained a clear solution which, in addition to trioxodizirconium hydroxy chloride, also contained a substantial amount of sodium chloride.

By starting with zirconyl bromide ($ZrOBr_2 \cdot 8H_2O$) or zirconyl iodide ($ZrOI_2 \cdot 8H_2O$) solutions of trioxodizirconium hydroxy bromide or iodide, respectively, may be obtained by analagous reactions. Such solutions will also, of course, contain sodium bromide or sodium iodide as the case may be.

No convenient way of separating the sodium halides from the zirconium salts is available. However, for many uses of solutions of the salts, including pharmaceutical ones, the presence of the dissolved sodium halide is not objectionable. Consequently, the method described in Example 4 may be conveniently employed in the preparation of solutions of trioxodizirconium hydroxy halides for such uses.

As previously mentioned, water solutions of the novel trioxodizirconium hydroxy halides of the present invention have acidities which are remarkably low in comparison with other water soluble zirconium salts. This characteristic is illustrated in the following table in which the pH values of dilute trioxodizirconium hydroxy chloride solutions are compared to those of solutions of zirconyl chloride of equal zirconium content.

Table I

| Gram-atoms of Zr per liter | pH values of solutions ||
|---|---|---|
| | $ZrOCl_2$ solutions | $Zr_2O_3OHCl$ solutions |
| 1.0 | 0.15 | 1.5 |
| 0.5 | 0.70 | 1.85 |
| 0.1 | 1.32 | 2.35 |
| 0.01 | 2.10 | 2.87 |

The hydroxy chloride solutions tested were obtained by successive dilution of a solution prepared by the method set forth in Example 4 and the zirconyl chloride solutions were made comparable by dissolving therein an equivalent proportion of sodium chloride. It will be noted that the acidities of the zirconyl chloride solutions are about 10 times as great as those of the corresponding trioxodizirconium hydroxy chloride solutions. Similar differences are found in comparing other zirconium halides with those of the present invention.

The trioxodizirconium hydroxy halides of the present invention are adapted for a wide variety of uses. Many of such uses stem from the comparatively low acidity of their solutions. For example, trioxodizirconium hydroxy iodide solutions have been found useful because of their antiseptic and marked germicidal properties and also as styptic solutions. The importance of the relatively low acidity of these solutions where the solutions are to be applied to the skin is evident. The novel halides of the present invention are also suitable for other uses, including, for example, the precipitation of acid dyes in the preparation of pigments.

It will be realized that the carbonates of other alkali metals, such as lithium and potassium, as well as ammonium carbonate may be used in place of sodium carbonate in carrying out the processes described herein for producing trioxodizirconium hydroxy halides. There is, however, no advantage to such use and consequently the sodium salt which is very much cheaper is preferred. If desired, a suspension of an alkaline-earth metal carbonate may be used instead of a solution of an alkali metal carbonate. In the process described in Example 4 such use will, of course, result in a solution containing an alkaline-earth metal halide. Instead of using zirconyl chloride as a starting material in carrying out the process described in Example 1 certain other water-soluble zirconium salts may be employed. However, zirconyl chloride is preferred because of its relatively low cost and the ease with which chloride ions may be removed from the precipitate. In forming solutions of trioxodizirconium hydroxy halides by the process of Example 4 the starting zirconium salt is, of course, determined by the product desired.

I claim:

1. A basic zirconium halide in the form of a water-soluble, glass-like solid having a composition corresponding to the formula $Zr_2O_3OHX \cdot yH_2O$ where "X" is a halogen selected from the group consisting of chlorine, bromine, and iodine and "y" is a variable number.

2. A basic chloride of zirconium having a composition corresponding to the formula $Zr_2O_3OHCl \cdot yH_2O$ where "y" is a variable number.

3. A basic bromide of zirconium having a composition corresponding to the formula $Zr_2O_3OHBr \cdot yH_2O$ where "y" is a variable number.

4. A basic iodide of zirconium having a composition corresponding to the formula $Zr_2O_3OHI \cdot yH_2O$ where "y" is a variable number.

5. A process for making a basic zirconium halide corresponding to the formula $Zr_2O_3OHX \cdot yH_2O$ where "X" is a halogen selected from the group consisting of chlorine, bromine, and iodine and "y" is a variable number, which comprises adding an aqueous solution of a zirconyl halide to a mixture of water and a carbonate selected from the class consisting of alkali metal carbonates and alkaline-earth metal carbonates to form an aqueous suspension of a precipitate, said suspension having a pH of substantially 4.0, filtering out and washing said precipitate, dissolving said precipitate in a hydrohalogen acid, said acid being added in a molal ratio of 1:2 with respect to the zirconium content, expressed as $ZrO_2$, of said precipitate, and evaporating the solution obtained.

6. A process as set forth in claim 5 in which said zirconyl halide is zirconyl chloride.

7. A process as set forth in claim 5 in which said zirconyl halide is zirconyl bromide.

8. A process as set forth in claim 5 in which said zirconyl halide is zirconyl iodide.

9. A process as set forth in claim 6 in which said carbonate is an alkali metal carbonate.

10. A process as set forth in claim 6 in which said carbonate is an alkaline-earth metal carbonate.

11. A process as set forth in claim 6 in which said carbonate is sodium carbonate.

12. A process for making a solution of a basic zirconium halide, said halide having a composition corresponding to the formula $Zr_2O_3OHX \cdot yH_2O$ where "X" is a halogen selected from the group consisting of chlorine, bromine, and iodine and "y" is a variable number, which consists in adding a mixture of water with 75 molal parts of a carbonate selected from the class consisting of alkali metal carbonates and alkaline-earth metal carbonates to an aqueous solution of 100 molal parts of zirconyl halide.

13. A process as set forth in claim 12 in which said zirconyl halide is zirconyl chloride and carbonate is sodium carbonate.

14. A process as set forth in claim 12 in which said zirconyl halide is zirconyl bromide and said carbonate is sodium carbonate.

15. A process as set forth in claim 12 in which said zirconyl halide is zirconyl iodide and said carbonate is sodium carbonate.

References Cited in the file of this patent

UNITED STATES PATENTS 2,316,141    Wainer _____ Apr. 6, 1943

OTHER REFERENCES

J. W. Mellor's "A Comprehensive Treatise on Inorganic and Theoretical Chem.," vol. 7, 1927 ed., pages 146, 147, 148. Longmans, Green and Co., New York.